United States Patent [19]

Cameron

[11] Patent Number: 4,485,911
[45] Date of Patent: Dec. 4, 1984

[54] TRANSFER MACHINE

[75] Inventor: George Cameron, Birmingham, Mich.

[73] Assignee: The Budd Company, Troy, Mich.

[21] Appl. No.: 342,633

[22] Filed: Jan. 26, 1982

[51] Int. Cl.³ .............................................. B65G 47/00
[52] U.S. Cl. .................................... 198/345; 198/472; 198/394
[58] Field of Search ............... 198/472, 345, 394, 648; 408/70, 44; 29/33 P, 563; 104/248, 242; 105/216

[56] References Cited

U.S. PATENT DOCUMENTS

| | | | |
|---|---|---|---|
| 3,315,778 | 4/1967 | Kendall Sr. et al. | 198/472 |
| 4,014,428 | 3/1977 | Ossbahr | 198/472 X |
| 4,103,232 | 7/1978 | Sugita et al. | 198/394 X |
| 4,239,445 | 12/1980 | Ozawa | 198/345 X |

FOREIGN PATENT DOCUMENTS 718336  2/1980  U.S.S.R. .............................. 198/648

Primary Examiner—Joseph E. Valenza
Assistant Examiner—Dennis Williamson
Attorney, Agent, or Firm—Edward M. Farrell; Herman Foster; Thomas I. Davenport

[57] ABSTRACT

A transfer machine for holding and moving work pieces from station to station for successive machining operations in which the work pieces are clamped to pallets disposed generally vertically. During loading and machining operations the pallets are clamped in a fixed relationship to guide rails but are moved between stations on anti-friction means in the form of rollers. Loading operations are conducted relative to an accurately located reference axis and a work piece is transferred to the pallet so that the location of the reference axis is accurate at each of the loading and machining stations.

6 Claims, 10 Drawing Figures

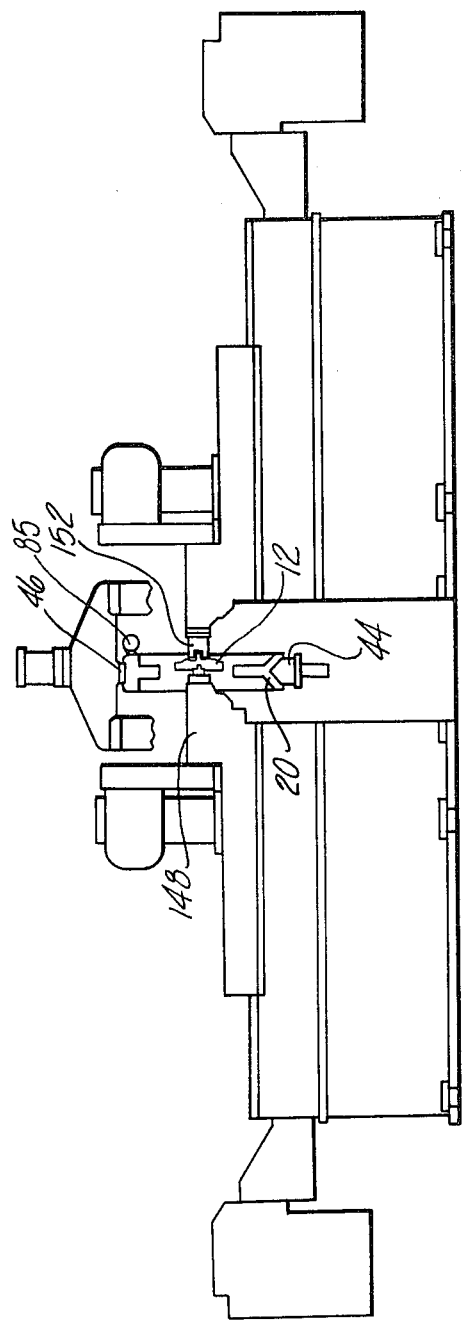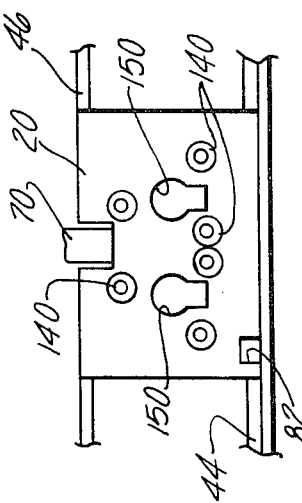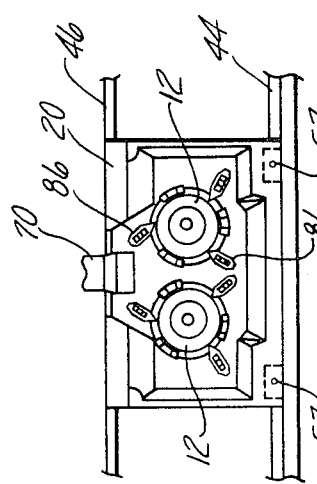

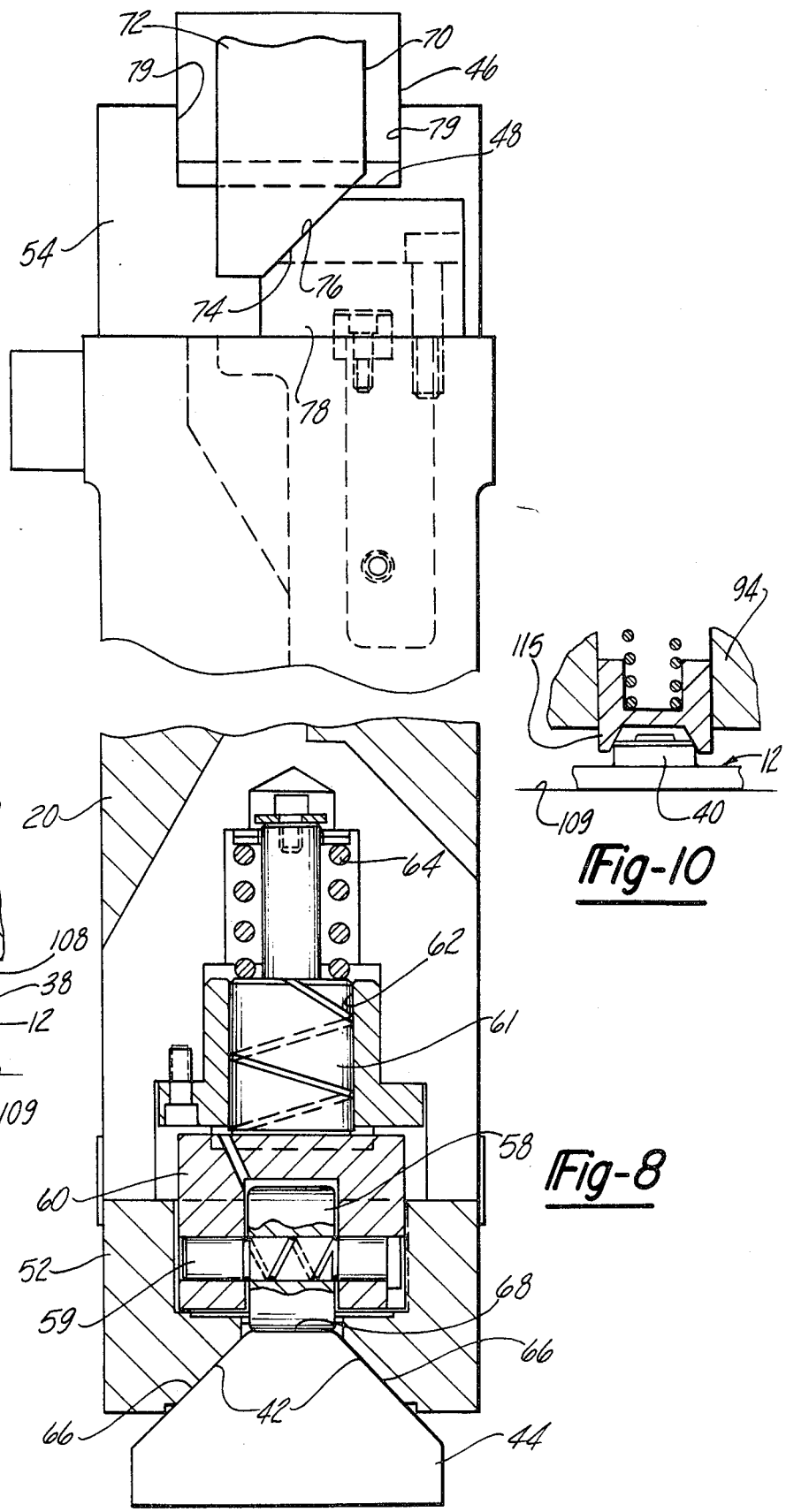

TRANSFER MACHINE

This invention relates to transfer machines for holding and moving a work piece from station to station for various machining operations at each of the stations.

Transfer machines have been used which employ moveable pallets on which work pieces are clamped to have various machining operations conducted at successive stations. Typically, such pallets must be very accurately constructed and accurately supported on guide means so that the pallet can be moved from station to station. Also, the work piece must be very accurately positioned on the pallet and this accuracy of both pallet and of the work piece must be exactly duplicated at each of the stations. In addition to the accurate alignment, successful operations require massive pallets to absorb loads imposed on both the work piece and the pallet by the various machining operations. Such weight causes wear of guides requiring frequent adjustment and replacement. It is not unusual in some transfer machines to require replacement of pallet shoes and guide rails.

It is an object of the invention to provide a transfer machine in which exact duplication of pallets is not mandatory to achieve accuracy at each of the work stations.

Still another object of the invention is to provide a transfer machine in which the pallets are moved from station to station on anti-friction means which minimizes wear on pallet portions and corresponding guide rails.

Still another object of the invention is to provide a transfer machine in which pallets are returned from their unloading position to a loading position without employing the usual complementary guide surfaces require during movement from work station to work station.

Yet another object of the invention is to provide a transfer machine in which work pieces are oriented and clamped to a face of a pallet with reference to a particular predctermined axis so that the disposition of the axis is duplicated at each of the work stations independently of the pallet dimensions.

The objects of the invention are accomplished by a transfer machine for holding and moving a work piece from station to station at which various operations are performed with the pallets disposed vertically during their movement in a horizontal path relative to elongated guide means in the form of rails disposed below and above the pallets. Means are provided for clamping the pallets in a fixed predetermined relationship at each station. The means by which the work pieces are loaded on the pallet include an arrangement for rotating a work piece to a predetermined position relative to a reference axis after which the reference axis is established relative to the pallet by clamping the pallet and loading means in fixed positions relative to each other. Thereafter the work piece is moved axially of the reference axis into engagement with the pallet where it is clamped. Subsequent movement of the pallet to the next adjacent station positions the work piece with its axis in a specific location parallel to the position of the reference axis in the loading station. This position is repeated at each subsequent work station as the result of which the pallets need not be exactly identical to each other. The pallets are transported between stations on roller means which minimize wear of the guide rails and the guide shoes attached to the pallet. At the end of the predetermined path through which the pallets move during the working operations, the work pieces are unloaded and the pallets are transferred to a return line. On the return line the pallets are transported without requiring the use of the guide surfaces so that wear is further minimized.

The preferred embodiment of the invention is illustrated in the drawings in which:

FIG. 5 is a diagrammatic view of one of the work stations of the transfer machine;

FIG. 6 is a diagrammatic view of the working side of a pallet on which work pieces are mounted showing the work pieces in place;

FIG. 7 is a diagrammatic view of the backside of the pallet seen in FIG. 6; and

FIG. 8 is an enlarged broken away cross-sectional view of the pallet seen in FIG. 2 taken generally on broken section line 8—8;

FIG. 9 is diagrammatic view at an enlarged scale showing a cone type locator used in the loading stage of the transfer machine in FIG. 3; and FIG. 10 is another diagrammatic view at an enlarged scale of a wedge type locator used in the loading stage of the transfer machine.

Figure 1:
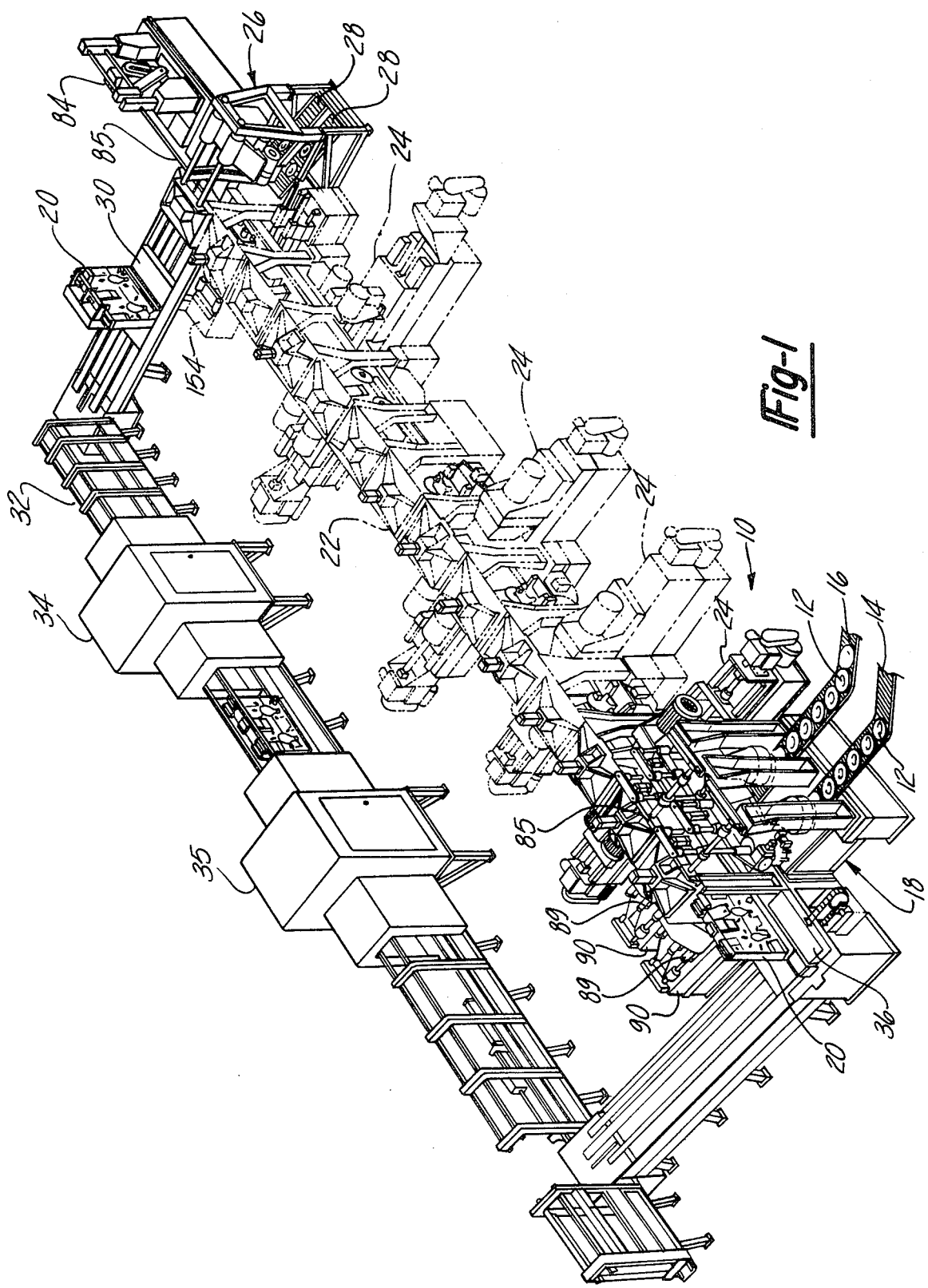
FIG. 1 is a perspective view of the transfer machine embodying the invention.

In general the transfer machine 10 is such that work pieces 12 are delivered to the machine by way of a pair of parallel roller type conveyors 14 and 16 to a loading station 18 at which the work pieces 12 are attached to one of a plurality of pallets 20. The pallets 20 are moved from the loading station 18 in a predetermined path or work line designated at 22 to successive stations 24 at which various machining and gauging operations are conducted. At the end of the work line 22 the pallets 20 reach an unloading station 26 at which the finished work pieces 12 are removed by way of roller conveyors 28. The pallets 20 are removed from the work line 22 on a carrier 30 and are transported transversly of the work line 22 to a return line 32 which extends generally parallel to the work line 22. On the return line 32 the pallets 20 are moved through cleaning stations 34 and 35. At the end of the return line 32, pallets 20 are transported transversly on a carrier 36 to a starting position at the loading station 18.

In the present instance the work pieces 12 which are being operated on are generally disc shaped having an axially disposed stub 38 and uniformly and circumferentially spaced lugs 40. The work piece 12 is by way of example, only and forms a portion of a housing for the converter of an automotive transmission. It will be understood however, that other parts not necessarily symmetrical or circular could be operated on in accordance with the teachings of the present invention.

Figure 3:
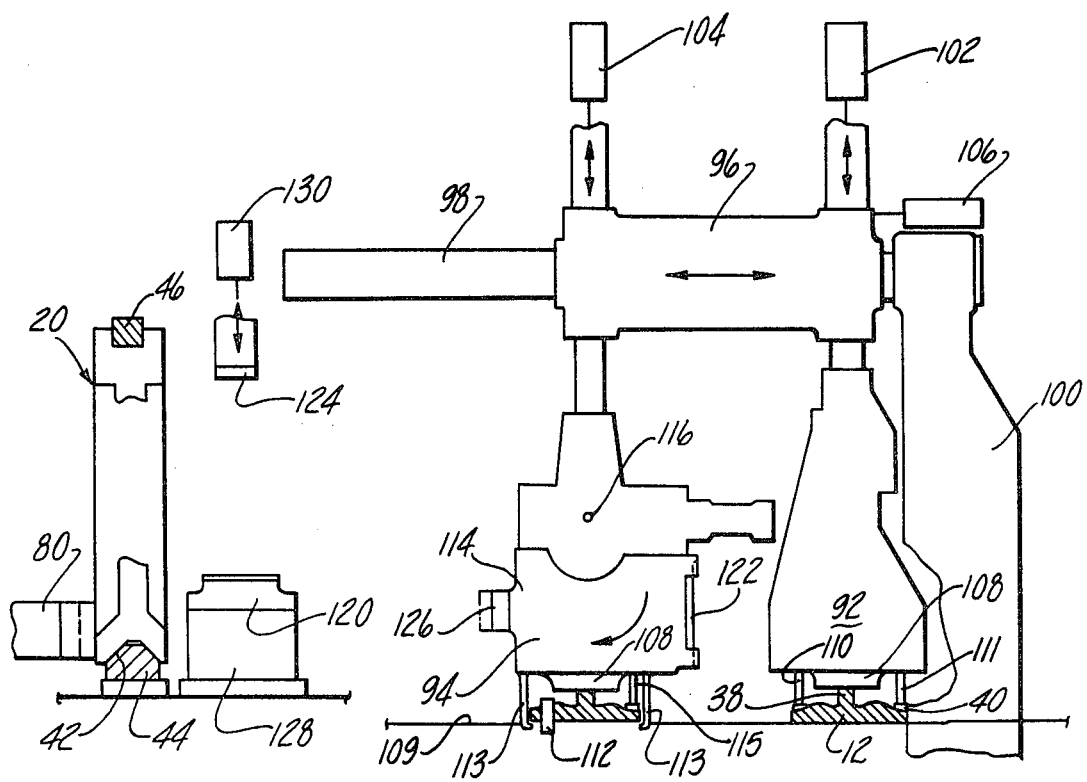
FIG. 3 is a diagrammatic elevational view of the loading stage of the transfer machine.
Figure 4:
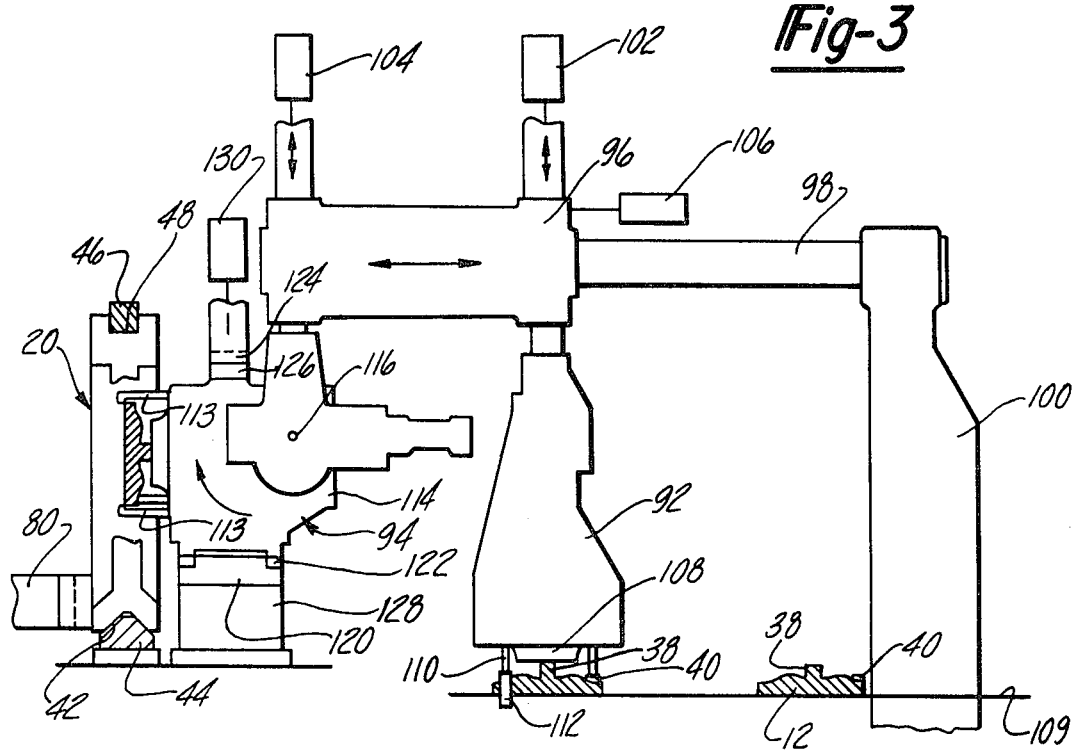
FIG. 4 is a view similar to FIG. 3 showing another condition of operation of the transfer machine.

The pallets 20 on which the work pieces are supported during the various machining operations at the stations 24 is rectilinear and is disposed in a vertical attitude. The bottom edge of the pallet has a generally V-shaped notch 42 as seen in FIGS. 3, 4, and 8 supported and guided relative to an elongated guide rail 44 having a generally V-shaped cross section. An upper edge of the pallet 20 is supported and guided by an upper guide rail 46 having a rectangular cross section disposed in complementary upwardly opening groove 48 formed in the upper edge of each of the pallet 20. The rails 44 and 46 form elongated guide means in a horizontal reference plane by which the pallets are guided from station to station.

The pallet 20 includes a body member 50 which supports a pair of lower shoes 52 in which the V-notches 42 are formed. Similarly a pair of upper shoe or guide members 54 forming the grooves 48 are detachably supported at the upper edge of the pallet 20. The shoes 52 and 54 are accurately machined and are replaced when they become worn.

To facilitate guided movement of the pallets 20 between successive stations, the leading and trailing ends of the lower edge of the pallets 20 are provided with roller means 56 best seen in FIG. 8 and located in the areas designated 57 in FIG. 6.

Each of the roller means 56 includes a roller 58 rotatably supported on an axle 59 mounted in a yoke 60. The yoke 60 has a spindle 61 which is slidably supported in a socket 62 for axial movement. The spindle 61 and the roller 58 are biased downwardly relative to the remainder of the pallet 20 by means of a spring 64 so that the roller 58 is brought into engagement with the top of the guide rail 44. The guide rail 44 has sloping sides 66 extending to opposite sides of a flat surface 68 which engages and forms the path for the rollers 58. Sloping sides of the rail 66 are complementary to the sloping sides of the V-notch 42 in the bottom of the lower shoes 52 of the pallets 20. The force of the springs 64 acting on the forward and rearward rollers are sufficiently strong so that they urge the sloping sides of the V-notch 42 out of engagement with the sides 66 of the rail 44 a slight amount permitting movement of the pallets on the rollers 58.

The upper edge of the pallets 20 are guided by relative sliding movement between the upper shoes 54 and the upper guide rail 46. However, the loading between the upper shoes 54 and rail 46 are at a minimum compared to the loads which must be absorbed by the lower rail 44. In an actual embodiment of the invention pallets 20 loaded with work pieces 12 weigh to the order of nine hundred pounds.

At the loading station 18 and the successive work stations 24 it is necessary to hold the pallets 20 in a fixed position which can be exactly duplicated at each successive station. For this purpose the pallets are clamped in a fixed relationship to the guide means formed by rails 44 and 46 by a hydraulcally actuated means for clamping indicated generally at 70 in FIG. 6 and 8. The clamping arrangement 70 serves to move the pallet 20 downwardly overcoming the force of the springs 64 so that the sides 66 of the guide rail 44 come into engagement with the complementary surfaces of the V-notch 42. In accomplishing this the pallets 20 are vertically and transversly fixed at their lower edge.

Figure 2:
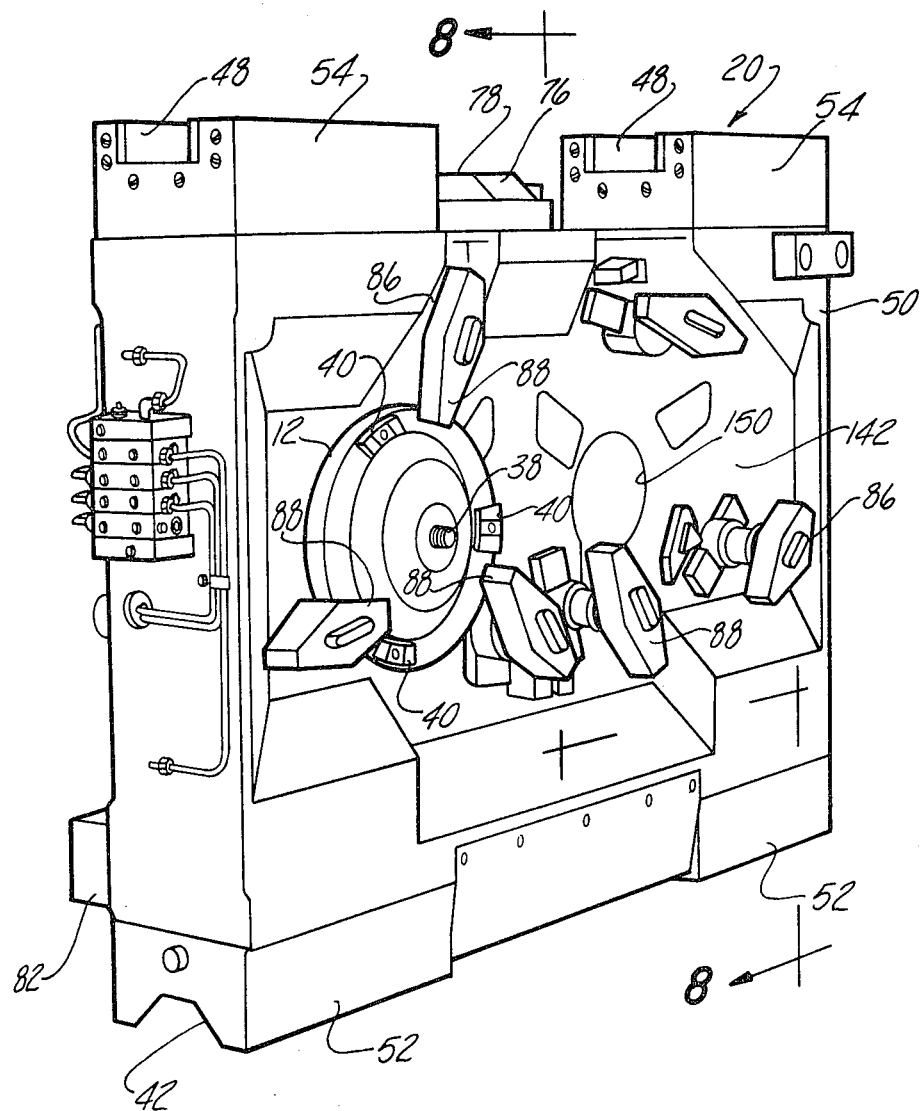
FIG. 2 is a perspective view of the pallets used in the transfer machine.

The upper edges of the pallets 20 are held in a fixed position against guide rail 46 by the clamping arrangement 70 which includes a vertically moveable clamp member 72 having an angled side surface 74 complementary to the angled surface 76 formed on a locating block 78 seen also in FIG. 2 mounted on the pallet 20 between the upper shoes 54.

When the clamping arrangement 70 is operated to move the clamping member 72 downwardly, the complementary surfaces 74 and 76 come into engagement with each other with the vertical component acting downwardly on the pallet to overcome the spring 64 and bring complementary surfaces 42 and 66 into abutting, clamped relationship to each other. A transverse or horizontal component of force resulting from downward movement of clamping member 72 acts to force the pallet so that one side surface 79 of the grooves 48 in the upper shoes 54 is forced against one side of the upper guide rail 46. In this manner the upper edge of the pallet 20 is held in vertically and transversly fixed position relative to the upper guide rail 46.

The location of the pallets 20 longitudinally of the guide rails 44 and 46 is determined by a lock bar 80 (FIGS. 3 and 4) which is moveable transversly of the lower guide rail 44 into a notch 82 formed in the rear side of the pallet 20 as indicated in FIG. 7. With the lock bar 80 in position in the notch 82 and with the clamping arrangement 70 actuated, the pallets are held in fixed position relative to the guide rails 44 and 46.

The pallets 20 are moved from the loading station 18 and through successive work stations 24 in a conventional manner by a bar drive mechanism indicated at 84 in FIG. 1 to reciprocate a bar 85 extending parallel to the path 22 of the pallets 20. Such bar drives are conventional and are not disclosed in great detail. However, upon reciprocation of the bar 85 the pallets 20 are attached to the bar 85 and transported simultaneously to the next adjacent station.

Each of the pallets 20 is provided with means to clamp a pair of pieces 12 and for that purpose each work piece position has three clamp mechanisms 86. Each of the clamp mechanisms includes a clamping finger 88 which can be rotated from a position illustrated at the right side of the pallet 20 in FIG. 2 to a position seen at the left to over lap the outer periphery of the disc shaped work pieces 12. The clamp fingers 88 also are moved axially to bring the fingers 88 into firm engagement with the work pieces 12 to hold them in a fixed position relative to the pallets 20. Actuation of the clamp mechanisms 86 is brought about by simultaneously engagement of all three clamp mechanisms 86 formed by a wrench mechanism 89 on a carrier 90 which can move transversly of the pallet 20 to bring wrench like ends into engagement with the clamp mechanisms 86. After the clamp mechanisms 86 are actuated the wrench mechanism 89 can be retracted on carrier 90.

The work pieces 12 are accurately loaded on the pallets 20 by loading means which includes a part placer or orientor 92 and loader 94 both of which are supported for vertical movement relative to a head 96 slidably supported on an arm 98 held in a substantially horizontal position by a frame 100.

The part orientor 92 and loader 94 can be moved vertically independently of each other by way of hydraulic means designated diagrammatically at 102 and 104, respectively. Also the part orientor 92 and loader 94 can be moved as a unit with the head 96 in a horizontal direction transversly relative to the work line 22 by means of a hydraulic ram indicated diagrammatically at 106.

The part orientor 92 incorporates a spring loaded cone locator 108 which engages the end of the stub 38 upon downward movement of the part orientor 92 to resiliently hold the work piece 12 and to align it axially on the work surface 109. An arm 110 projecting form the bottom of the part orientor 92 rotates in an arc relative to the axis of the stub 38 to engage the side of one of the lugs 40 on the work piece 12 and rotate the work piece relative to the axis of the stub 38 until the side of another of the lugs 40 engages a stop 111 projecting in a fixed position from the bottom of the part orientor 92. This establishes the work piece 12 in a predetermined, preliminary orientation axially and rotationally relative to a vertical reference axis and at the same time the cone locator seen also in FIG. 9 resiliently maintains the work piece 12 firmly on the surface 109.

While the work piece 12 is maintained rotationaly in its oriented position, it is moved horizontally to the left on the surface 109 by the part orientor 92 upon actuation of the hydraulic actuator 106. Movement of the head 96 to the left from the position in FIG. 3 to the position in FIG. 4 places the work piece 12 in a second position on the work surface 109 where it is clamped by hydraulic clamps 112 associated with the work surface 109. Part orientor 92 then can be retracted vertically upward by means of hydraulic actuator 102.

At the same time that orientor 92 is being lowered to engage work piece 12 in the first position, the loader 94 is being lowered in the second position to engage another work piece 12 previously deposited there by the part orientor 92 and held in firm position on the surface 109 by clamps 112. In the second position, the stub 38 on the work piece 12 is engaged by another spring loaded cone actuator 108 associated with the loader 114. As the loader 114 moves downwardly, the ends of fingers 113 extending from the bottom of loader 94 pivot under the edges of work piece 12 and the clamps 112 are released. The spring loaded cone actuator 108 associated with loader 94 serves to finally align the work piece 12 axially if this has not already been accomplished by the locator 108 associated with the part orientor 92. Also an additional spring loaded wedge locator 115 seen also in FIG. 10 and projecting from the bottom of the loader 94, moves into engagement with one of the lugs 40. The sides of the wedge serve to engage opposite sides of the lug 40 to rotate the work piece 12 any slight amount that might be necessary to make a final, accurate correction to rotationally position the work piece about its axis and relative to the loader 94. The work piece 12 is now held resiliently but firmly against the work surface 109 by the cone locator 108 and the wedge locator 115. Thereafter, as the loader 94 is moved upwardly by the hydraulic actuator 104, the spring loaded cone actuator 108 and spring loaded locator 115 resiliently hold the work piece 12 against the ends of the fingers 113. As the loader 94 continues to be moved vertically upwardly the work piece 12 is held against the loader 94 by the fingers 113 while the head 114 is pivoted about an axis designated generally at 116 from the position illustrated in FIG. 3 to the position illustrated in FIG. 4. In FIG. 3 the reference axis of the work piece 12 is vertical and in FIG. 4 the axis extends horizontally. Subsequent horizontal movement of the head 96 on the arm 98 moves the work piece 12 against the side surface of the pallet 20 for subsequent clamping. At the same time part orientor 92 moves the next work piece 12 from the first position to the second position.

With the head 114 of the loader 94 disposed with the axis of the work piece in a horizontal position and after advancement of the head 96 on the arm 98 to bring the work piece 12 into engagement with the surfaces on the pallet 20, the head 114 is clamped between a lower set of complementary V-blocks 120, 122 and an upper set of complementary V-blocks 124, 126. The V-block 120 is very accurately positioned on a pedestal 128 for engagement with the complementary V-block 122 mounted on the head 114. The upper set of V-blocks 124, 126 includes hydraulic actuator 130 to move and clamp the V-block 124 against the complementary V-block 126 and V-blocks 120 and 122 against each other. Because of the sloping sides of the V-blocks 120, 122, 124, 126 the head 114 of the loader 94 is accurately clamped in a predetermined location with the orienting axis of the work piece 12 disposed horizontally. This establishes and fixes the vertical height of the orienting axis as well as the horizontal position. The transverse or axial position of the work piece 12 is determined by its engagement with the face of the pallet 20.

To obtain accurate positioning of the orienting axis, the head 114 can move vertically relative to the pallet 20 to seat in the mating V-blocks. Such vertical movement is accomplished by way of the vertically moveable raising and lowering mechanism including hydraulic actuator 104. Horizontal movement transversly to the pallet 20 is permitted by way of the head 96 on the arm 98. Also movement of the axis in a horizontal direction longitudinally of the guide rails 44 and 46 is afforded by sliding movement of the head 114 along its pivot axis 116. Such sliding movement is brought about by the wedging action of the V-blocks 120, 122 and 124, 126.

Referring again to FIG. 2, the pallet 20 has two positions for simultaneously holding a pair of work pieces 12. Only one such work piece 12 is shown in the loaded position in FIG. 2. Each work piece station includes three uniformly spaced clamp mechanisms 86 which are supported relative to the pallet 20 for slight rotation to overlie the work piece 12 and for movement axially relative to the work piece 12 to engage the outer face of the work piece and clamp it against the seating surface 142 of the pallet 20. Such rotation and axial movement of the clamp mechanisms or heads 86 is achieved in a well known manner by the wrench mechanism 89 seen in FIG. 1 which is moveable into engagement at the back surface of the pallet 20 to engage and rotate the wrench ends 140 seen in FIG. 7 and move the clamps axially to clamp the work piece 12 against the seating surface 142. No locators or other positioning devices are required.

After the work piece 12 is clamped against the seating surface 142 of the pallet 20, the finger clamps 113 on the head 114 can be released from the work piece and the head 96 can be released from the work piece and the head 96 can be retracted on arm 98 to its initial position illustrated in FIG. 3. At the same time the wrench mechanism 89 can be retracted leaving the pallet 20 clamped relative to the guide rails 44 and 48. Subsequently the lock bar 80 can be retracted from the locating block 82 (FIGS. 2 and 7) and the clamp member 72 seen in FIG. 8 can be raised to disengage the angled surfaces 74 and 76. This causes the roller spring 64 to force the pallet rollers 58 downwardly to disengage surfaces 42 and 66 and to raise the pallet 20 a slight amount out of engagement with the guide rail 44. The pallet is now in readiness to be advanced by the bar drive means 84 and bar 85 from the loading station to the next adjacent loading station.

With the first work piece 12 clamped to the pallet 20 the pallet is advanced to the next station at which a second work piece 12 can be loaded in the second position by loading means identical with the loading means associated with the first loading station.

After the pallet 20 is loaded with two work pieces the pallet can be moved to the first working station 24 during which time the pallet is supported by rollers 58.

When the pallet reaches the first work station 24 it is released from the ransfer bar 85 and reclamped relative to the guide rails 44 and 48 and lock bar 80 and 82 in the same manner as in the loading stations. In such stations machining or other operation can be conducted from both sides of the pallet 20. Also the machining operations can be conducted by duplicate machines which operate simultaneously on both of the work pieces 12. By way of example, as seen in FIG. 5, the spindle on the work piece 12 could be machined from the rear side of the pallet by a tool which would have access through the openings 150, seen in FIGS. 2 and 7. At the same time, a tool head 152 could work on the opposite side of the work piece 12 to machine the work piece 12.

As seen in FIG. 5 the vertical disposition of the pallet 20 makes it possible to have the machine heads 148 and 152 working at opposite sides of the work piece 12 disposed in relatively close relation to each other and with a minimum overhang. This makes for greater machining accuracy. Moreover metal chips cut away by the machine heads 148 and 152 fall without obstruction by the pallet or machines to the space between the machines to be carried away, typically by water flow.

As many stations 24 as desired may be provided, each of which can be used to conduct different machining or gauging operations. At the end of the line 22 the finished work pieces 12 are released from the pallet 20 by a wrench mechanism 154 so that the work pieces 12 travel on roller conveyors 28 and are removed for assembly or further operations. After release of the work pieces 12 the pallet 20 can be transferred into its return path by way of the carriage 30 to the return line 32.

A transfer machine has been provided including loading means for loading work pieces onto vertically disposed pallets which travel in a predetermined path from station to station in which the pallets and the loading means are accurately clamped relative to each other during transfer of the work piece from the loading means to the pallet axially relative to a reference axis. Subsequent transfer of the pallets to the next adjacent station and clamping of the pallet at that station reestablishes the same relationship of the work piece relative to a reference axis. The same reference axis relationship is duplicated at each work station and the vertically disposed pallets are transferred between the stations on antifriction or roller means to minimize wear on the mating clamping parts which accurately establish the location of the pallet and therefore the work piece at each of the work stations.

The embodiments of the invention in which an exclusive property or privilege is claimed are defined as follows:

1. A transfer machine for holding and moving a work piece from station to station for work operations at said stations, comprising: a plurality of pallets moveable horizontally in a predetermined path, elongated guide means including a rail disposed in a horizontal reference plane for guiding said pallets furing movement from station to station, said pallets having surfaces complementary to surfaces on said rail and engageable therewith upon clamping at each said station, means on said pallets biasing said surfaces out of engagement with each other during movement of said pallets from station to station, means for clamping said pallets in a stationary location at each of said stations, a work surface for receiving a work piece, means for rotating said work piece on said work surface to a predetermined position about a vertical reference axis, loading means for moving said work piece into engagement with one of said pallets at a first one of said stations from a position in which said reference axis is vertical to a position in which said reference axis is horizontal, means for clamping said work piece in fixed relation on said pallet while said work piece is maintained in predetermined location relative to said horizontal reference axis, and means for moving said pallets with said work piece simultaneously to the adjacent station.

2. The transfer machine of claim 1 wherein said means biasing said surfaces out of engagement with each other are overcome when said pallets are clamped in said stationary location.

3. The transfer machine of claim 1 wherein said means biasing said surfaces out of engagement include rollers engageable with said rails for movement of said pallets from station to station.

4. The transfer machine of claim 3 wherein said rollers are engageable with a rail surface separate from said complementary clamp surfaces.

5. The transfer machine of claim 4 wherein said surface engaged by said rollers is disposed between said complementary clamp surfaces.

6. The transfer machine of claim 3 wherein said biasing means and rollers are disposed at opposite ends of said edge of each of said pallets.

* * * * *

UNITED STATES PATENT AND TRADEMARK OFFICE
CERTIFICATE OF CORRECTION

PATENT NO. : 4,485,911

DATED : December 4, 1984

INVENTOR(S) : George Cameron

It is certified that error appears in the above-identified patent and that said Letters Patent is hereby corrected as shown below:

Claim 1, line 6, cancel "furing" and substitute therefor --during--.

Signed and Sealed this

Twenty-fifth Day of June 1985

[SEAL]

Attest:

DONALD J. QUIGG

Attesting Officer     Acting Commissioner of Patents and Trademarks